US009289698B2

(12) United States Patent
Abramov et al.

(10) Patent No.: US 9,289,698 B2
(45) Date of Patent: *Mar. 22, 2016

(54) METHOD FOR PRODUCING EXTRACTS FROM MATERIALS AND DEVICE FOR REALIZING SAME

(75) Inventors: Yakov Kuzmich Abramov, Moscow (RU); Vladimir Mihailovich Veselov, Moscow (RU); Viktor Mihailovich Zalevsky, Moscow (RU); Vitaly Grigorevich Tamurka, Moscow (RU); Olga Borisovna Smirnova, Moskovskaja obl. (RU); Natalja Vladimirovna Veselova, Moskovskaya obl. (RU); Veniamin Sergeevich Volodin, Moskovskaya obl. (RU); Larisa Sergeevna Ermakova, Moscow (RU); Anatoly Fedorovich Khanin, Moscow (RU)

(73) Assignee: Twin Technology Company, Moscow (RU)

( * ) Notice: Subject to any disclaimer, the term of this patent is extended or adjusted under 35 U.S.C. 154(b) by 721 days.

This patent is subject to a terminal disclaimer.

(21) Appl. No.: 13/574,974

(22) PCT Filed: Aug. 13, 2010

(86) PCT No.: PCT/RU2010/000447
§ 371 (c)(1),
(2), (4) Date: Jul. 24, 2012

(87) PCT Pub. No.: WO2011/096843
PCT Pub. Date: Aug. 11, 2011

(65) Prior Publication Data
US 2012/0301550 A1    Nov. 29, 2012

(30) Foreign Application Priority Data
Feb. 3, 2010  (RU) .............................. 2010103414

(51) Int. Cl.
*A61K 35/37* (2015.01)
*C11B 1/00* (2006.01)
(Continued)

(52) U.S. Cl.
CPC ........ *B01D 11/0215* (2013.01); *B01D 11/0219* (2013.01); *B01D 11/0226* (2013.01)

(58) Field of Classification Search
USPC ................................................. 422/261–292
See application file for complete search history.

(56) References Cited

FOREIGN PATENT DOCUMENTS

| GB | 252190 | 7/1927 |
| GB | 912326 | 12/1962 |
| RU | 2063784 | 7/1996 |
| RU | 2163827 | 3/2001 |

(Continued)

*Primary Examiner* — Chris R Tate
*Assistant Examiner* — Russell Fiebig
(74) *Attorney, Agent, or Firm* — Yefim Kreydin

(57) ABSTRACT

The invention relates to a process and apparatus of extraction with the use of vacuum and can be used to extract the bioactive agents from raw materials. The method of extraction of materials, includes the heating the extractant, the preliminary extraction of raw materials with the heated rollers by means of extractant, the impregnation of raw material with extractant and extraction of raw materials in vacuum-impulsive mode by cycles, which include the heating with hot coolant gas not exceeding 39° C. and a creation of vacuum in the chamber in the regime of quick vacuum-impulsive exposure with stepwise multiple pressure drop from the atmospheric pressure to the pressure not more 0.0001 MPa, followed by keeping under vacuum to stabilize the temperature of the mixture and the vacuum relief at the end of the cycle. The distilled water, or organic solvents or mixtures thereof are used as the extractants.

3 Claims, 1 Drawing Sheet

(51) Int. Cl.
*B01D 11/02* (2006.01)
*B01J 19/00* (2006.01)
*A61L 2/00* (2006.01)
*A61L 9/00* (2006.01)
*A61K 35/12* (2015.01)
*A61K 36/00* (2006.01)

(56) References Cited

FOREIGN PATENT DOCUMENTS

| | | |
|---|---|---|
| RU | 2213606 | 10/2002 |
| RU | 2332026 | 7/2004 |
| RU | 2344166 | 1/2009 |
| SU | 850108 | 7/1981 |

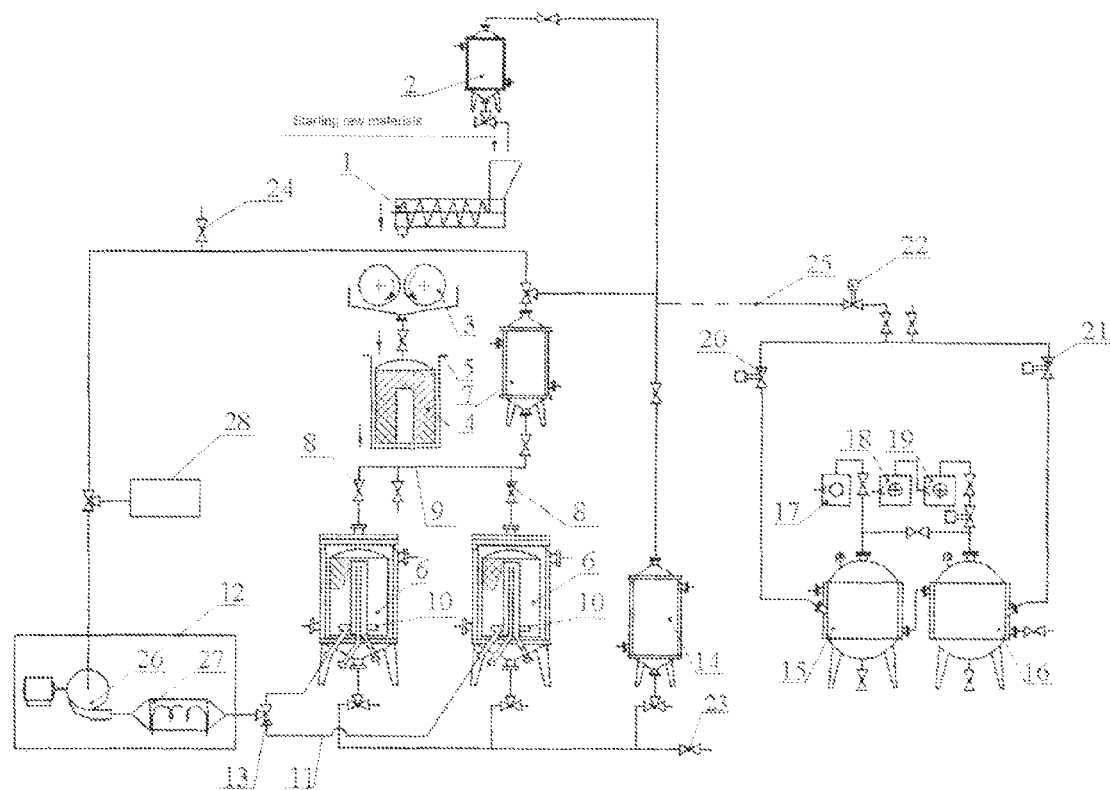

METHOD FOR PRODUCING EXTRACTS FROM MATERIALS AND DEVICE FOR REALIZING SAME

This application is the United States national phase application of International Application PCT/RU2010/000447 filed Aug. 13, 2010, which claims the benefit of Russian Patent application No RU 2010103414 FILED. Feb. 3, 2010, the entire disclosure of which is incorporated herein by reference.

The invention relates to a process of extraction with the use of vacuum and can be used to extract the drug or other valuable bioactive agents from plant, animal, fish, seafood and other types of raw materials used in chemical, food and cosmetic industry and medicine.

BACKGROUND OF THE INVENTION

A method of producing extracts is currently in use (patent RU 2232026 A61K35/78, V01D 11/02) by means of extraction of ground plant raw material under vacuum (up to −0.3 atm.) at 15-35° C. for 1-15 days, using structured water as the extractant.

The main disadvantage of this method is that the process of extraction is carried out in a laminar diffusion regime (infusion at a fixed bed of solid phase), in which a rapid saturation of an extractant layer near the solid particles with extractables takes place, which leads to a decrease in the concentration gradient during the saturation time and the fall effectiveness of the extraction process. In addition, the said method does not provide a sufficient overheating of the solvent in the material, which leads to a decrease in the yield of extractable substances. The disadvantage of this method is a significant process duration (1-15 days), which does not exclude the formation of various microorganisms, especially bacteria, molds, fungi, yeast and can lead to a souring of a mixture.

A method of extracting materials is currently in use (patent RU 2163827 V01D 11/02), including the crushing of raw materials, vacuum treatment, contacting with a solvent, heating of a mixture and extracting in a vacuum-impulsive mode. Prior contacting with components the solvent and raw materials are heated and degassed using a vacuum-impulsive treatment. The heating of the components and their mixtures is carried out to a temperature not causing the denaturation of the material. The extraction is carried out at a residual pressure of 0.1-13.3 kPa and at time to achieve it and relief—0.5-1.0 sec, temperature of 40-80° C. at the module (extractant: raw materials) which is equal to 10.

Said method of extraction has some disadvantages. Under the proposed modes of vacuum treatment the method does not provide a sufficiently complete extraction of components from the raw materials. Extraction of raw materials is carried out at high flow rate of extractant (module (extractant:raw materials) is equal to 10). Moreover, the extraction process is carried out at temperatures of 40-80° C., in consequence of which a destruction of a number of biologically active components takes place, which greatly reduces the quality of the extracts obtained.

Method of extraction of raw materials is currently in use (RU 2213606 B01D 11/02). The method includes the grinding and heating of raw materials, the degassing of raw materials and extractant, heating the solvent to a temperature by 5-15° C. below the temperature of heating of raw materials, at that the degassing of raw materials and extractant is carried out separately using impulsive-vacuum treatment including keeping the mixture during 3-5 minutes after each impulsive-vacuum treatment cycle. The extraction is carried out in vacuum-impulsive mode at 70° C. and residual pressure in the receiver of 1-10 mm. Hg.

An apparatus that realizes the said method of extraction is currently in use (patent RU 2213606 V01D 11/02) containing an extractant tank and extractor, which are interconnected and to a pipeline through the quick response valves, to a condensate receiving tank and receiver, a vacuum pump which is connected to a receiver, a reflux condenser which is installed above the extractor, providing a condensation of the vapor of the extractant, a heater and a pump providing heating and delivering of the heating liquid medium into the extractant tank and the extractor tank.

The said method of extraction and the apparatus possess some disadvantages. Under the proposed mode of vacuum treatment the method and apparatus do not provide a sufficiently complete extraction of components from the raw materials. Extraction of raw materials is carried out at high flow rate of extractant (module extractant:raw material is equal to 10). Moreover, the extraction processes are carried out at temperatures up to 70° C., in consequence of which a destruction of various biologically active components takes place, which greatly reduces the quality of the extracts obtained. The latter circumstance leads to the inapplicability of the method for obtaining high-quality pharmaceutical preparations of plant, animal raw materials and seafoods.

An apparatus for producing the extracts (inventor's certificate SU No V01D 850 108 11/00) which has a cylindrical body with a rotor, separated with the radial walls into chambers, equipped with hinged bottom doors and spray system with shut-off valves in the upper part of the solvent receiver, the device for loading and unloading of solid substances. The extractor is equipped with bars, which are installed including the ability of reciprocal motion, located on them turners, guide and lever connected to the Shut-off valve.

The disadvantage of this apparatus includes raised packing of solid mass on the surface of the bottom, while the reciprocating motion of agitator turners occurring, which increases the hydraulic resistance of the layer of a solid phase, reducing the velocity and quality of the extraction process. The disadvantage is also includes a structural complexity of the apparatus.

It should be noted, that at temperatures above 39° C. the fast and irreversible processes in materials often occurs, which do not lead directly to denaturation, however, adversely affecting the biological activity of the contained components. For example, some organic compounds may have a transition from one configuration to another one including the loss of biological activity.

No above methods are applicable for the extraction of easily oxidized substances.

The aim of the present invention is to develop a method for extracting of different types of biological raw materials and the apparatus for implementing this method, allowing to increase the yield of extractable substances and improve their quality due to the possibility of conducting the processes at lower temperatures, as well as preventing oxidative reactions in the material.

SUMMARY OF THE INVENTION

To solve the set problems, a method comprising heating the extractant, the preliminary extraction of raw materials on the heated rollers with the extractant at the module (extractant: raw materials), not more than 2, the impregnation of the raw materials with extractant and extraction of the raw material in the vacuum-impulsive mode allows performing, the impregnation and extraction of raw materials in the vacuum-pulse mode in a cycle mode, which includes the heating with hot coolant gas and creating a vacuum in the chamber in a high-velocity mode from the atmospheric pressure to a pressure not exceeding 0.01 MPa, and then from the previous pressure to a pressure not more than 0.0001 MPa, followed by the exposure under vacuum to stabilize the temperature of the mixture and vacuum relief at the end of the cycle by means of delivering of hot coolant gas, at that the heating of raw materials is carried out to a temperature not exceeding 39° C.

The method involves the use of distilled water or organic solvents or their mixtures as an extractant.

If necessary, a chemically inert gas that prevents oxidation reactions in the materials is used as coolant gas.

To implement the proposed method of extraction an apparatus is used, which includes a screw doser connected to the extractant tank, the continuous heated rollers, equipped with a mesh receiving container to collect the resulting presscake, impregnated with extractant, one or two extractors, connected with a pipeline through valves with reflux condenser, extract receiving tank in their turn are interconnected to a receiver, which is connected to the vacuum pump, additionally equipped with a bubblers installed at the bottom of each extractor and connected to a coolant gas supply system through the pipeline, and to additional one or more receivers with vacuum pumps, installed parallel to the first receiver and connected through a system of vacuum pipes with quick response valves to inputs to the extractors.

Bubblers may have the holes of diameter of 1-6 mm for a better process intensification.

Coolant gas supply system is equipped with a fan and heating device.

In addition, the apparatus is equipped with a source of inert gas to carry out the process of extraction of materials containing readily oxidizable substances.

Consequently, the distinctness from the prior art consists in a different mode of contact between material and extractant, in the other version of design of the apparatus to perform these changes, i.e. the proposal has a novelty.

Comparative analysis of the proposed solution not only with a prior art, but also with other technical solutions in this area allowed revealing a set of features that distinctive the proposed technical solution to the current state of art that allows us to conclude that the solution meets the criterion of an "inventive level".

The proposed method and apparatus allow conducting the efficient extraction of raw materials at low temperatures (not exceeding 39° C.), which is explained as follows. Vacuum-impulsive extraction of raw material with a stepwise pressure drop accelerates the diffusion of the extractant into the deeper structures of a material and inside the cells with each step, which is accompanied by intense heat- and mass transfer and, consequently, leads to a more complete extraction of components from raw materials. In addition, at sharp impulsive pressure drop up to saturated vapor pressure the formation of cavitation bubbles of extractant takes place, resulting in a hydraulic shock in the mix, and as a result in disintegration and homogenization of the material. Number of pressure drops steps and vacuum impulses depend on the type of starting materials and the need for extraction of some components. Vacuum relief and heating the mixture is performed by means of delivering to the extracting chamber of heated gas coolant through bubblers with holes of 1-6 mm in diameter, which creates a "boiling centers" in the system, provides the mixing and homogenization of the mixture, increases the mass- and heat transfer, favors a more efficient extraction. The process is accompanied by strong shock waves in the extraction mixture, which further breaks down the cellular structure of the material due to shock loadings and the accumulation of dynamic and fatigue stresses resulting from changes in the difference of the intracellular and external pressure. Consequently, a stepwise multiple vacuum-impulse extraction of raw materials accompanied by the increase the vacuum depth at each step and the delivering of heated coolant gas into the extraction chamber have synergism. Use of receivers, connected in parallel to the extractors in an apparatus provides an opportunity to conduct more intensive process of extracting in a vacuum-impulsive mode by means of stepwise vacuum creation, at first from the first receiver, then from the second receiver with deeper vacuum.

DETAILED DESCRIPTION OF THE EXEMPLARY EMBODIMENTS

The drawing (see FIG. 1) shows the apparatus for the extraction of materials, which includes a screw doser 1, which is delivered with raw materials into its hopper and extractant is dosed in from the extractant tank 2. Below the screw doser the continuous heated rollers 3 are installed for pre-extraction process conducting. A presscake obtained on rollers 3, impregnated with extractant, is collected in the receiving mesh container 4 of the tank 5. To carry out the extraction process the apparatus is equipped with the extractors 6 (which a container with the starting pulp is installed in). Above extractors 6, the reflux condenser 7 is installed, which is connected to them through the valves 8 of common pipeline 9. The extractors 6 are equipped with the bubblers 10, installed in the bottom of each extractor 6 and are connected by pipeline 11 to a coolant gas supply system 12 through the valve 13. The resulting extract is collected in the extract receiving tank 14. The pipelines connect all parts of apparatus to each other and to the receivers 15 and 16, which are delivered with vacuum with the vacuum pumps 17, 18 and 19 through quick-response valves 20, 21 and 22, and the connection with the atmosphere is performed through the valves 23 and 24. Each part of apparatus is equipped with valves, respectively, to connect to vacuum line 25.

The proposed scheme of connection of receivers 15, 16, and the vacuum pumps 17, 18 and 19 allow applying a multiple stepwise pressure drop and creating more favorable conditions for the extraction of materials in the vacuum-impulsive mode.

The device of coolant gas delivering 12 is equipped with the fan 26 and heating device 27.

The device for extraction is equipped with the inert gas source 28, used while extracting of easily oxidized substances.

The device for extraction operates as follows:

Preparation of raw materials and extractant.

The raw materials are washed and cleared.

In the extractant tank 2, the extractant is heated to the process operating temperature. The distilled water, or organic solvents, or mixtures thereof are used as the extractants.

Rolling of the Prepared Raw Materials

The prepared raw material with screw doser is delivered to a continuous heated rollers 3, simultaneously heated extractant is delivered from the extractant tank 2 into a screw doser hopper in the amount required to ensure the module extraction (extractant:raw materials), should not be more than 2. On the heated continuous rollers 3 the mixture of raw material and extractant is heated (to a temperature not exceeding 39° C.), under the influence of shearing deformations the material is crushed, intensely mixed and pre-extracted. Due to extractant absorption by ground raw material at shearing deformations, the extraction process proceeds up to the start of pressing of raw materials with rollers. When crushing the raw materials with rollers, the partial destruction of fibrillar structure of material and part of membranous walls occurs. At following vacuum-impulsive impregnation of raw material with extractant the diffusion of extractant into the material structure increases and intensifies leading to yield increase of extractable components.

Vacuum-Impulsive Impregnation of Material

The receiving mesh container 4 with the obtained on continuous heated rollers 3 heated started presscake, mixed with the extractant, is installed in one of extractors 6, which is connected to the receivers through a vacuum line with quick response valve 22. In the apparatus the two extractors 6 are provided to ensure the process continuity. While mixture heating is carried out in one extractor, the vacuum treatment is carried out in another on and vice versa. Then the heated extractant is delivered into the extractor, so that the total module (extractant:raw materials) amounted to no more than 4. The mixture is heated with hot coolant gas to operating temperature not exceeding 39° C. After this the quick pressure drop (quick vacuum treatment) is performed for no more than 1.0 sec. from the atmospheric pressure to a pressure not exceeding 0.01 MPa by means of extractor 6 connecting to the receiver 15 and then quick pressure drop is performed for less than 1.0 sec. from the previous pressure to the pressure of not more than 0.0001 MPa by means of chamber connection to the receiver 16.

While vacuum treatment is performed, the extract ant is partially vaporized; resulting in reduced temperature of the mixture, the boiling stops, and the temperature stabilizes. Upon exposure under vacuum (1-3 min.), the extractor 6 is connected to the coolant gas supply system 12, at that vacuum is relieved, and coolant gas, while passing through the bubblers 10 with holes of small diameter (1-6 mm.), provides a mixing and homogenization of the mixture. During procedure of impregnation of raw material the residual gases and vapors are removed from the surface and inner layers of raw materials, the surface area is increased that enables the efficiency of the following vacuum-impulsive extraction.

While extracting raw materials, containing readily oxidizable substances; before vacuum-impulsive impregnation a purging with inert gas is carried out. An inert gas is used as coolant gas.

Extraction of the Material

Vacuum-impulsive extraction is carried out at operating temperature not exceeding 39° C. The mixture is heated to the required temperature with heated coolant gas delivered through a bubbler 10 into the extractor 6, a quick pressure drop (quick vacuum treatment) is performed for no more than 1.0 sec: from atmospheric pressure to a pressure not exceeding 0.01 MPa by means of extractor 6 connecting to the receiver 15 and then quick pressure drop for less than 1.0 sec. from the previous pressure to a pressure of not more than 0.0001 MPa by means of chamber connection to the receiver 16. The mixture is kept under vacuum until stop of the solvent boiling and stabilizing the temperature of the material (1-3 min), depending upon the type of the extracted material. This is accompanied by intensive boiling of the mixture, at that extractant boils not only in the whole volume of the mixture, but also within the extracted material. Upon reaching the stabilized temperature of the material the extractor 6 is connected to a coolant gas supply system 12, and vacuum is relieved from extractor. Mixture is heated to operating temperature (not above 39° C.), and in addition, the gas coolant which passes through the bubblers with holes of small diameter (1-6 mm.), provides additional mixing and homogenization of the mixture, the intensity of the extraction process increases significantly.

While extracting the raw materials, containing readily oxidizable substances, an inert gas supplied from the inert gas source 28 is used as the coolant gas.

The obtained extract is collected to the extract receiving tank 14.

According to the proposed processing, it is possible to produce pharmaceutical forms of almost all plants (more than 200 species of drug plants used in scientific or folk medicine), mushrooms, seafoods and other biologically active raw materials for their further use for other purposes.

The technical result achieved by above-mentioned features, leads to significant intensification and increased efficiency of the extraction process at low temperatures (up to 39° C.), low flow rate of extractant, the increase of quality and yield of extracted components, reducing the process time and energy costs.

Examples of extraction of vegetable and animal raw materials are shown below.

1. Extraction of Sea Buckthorn Seeds 0.5 kg of sea buckthorn seeds is placed in a screw doser hopper. A mass of sea buckthorn seeds is covered with extractant (vegetable oil) heated to a temperature of 39° C. (module 1). The mixture is delivered with the screw doser to the heated rollers, which support the temperature of 38-39° C., and rolled for 4 min. The resulting presscake from rollers is placed into the extractor, additional hot extractant is added (module 3), heated with hot purified air to 39° C. and subjected to a quick vacuum-impulsive exposure for 0.5 sec. with a stepwise quick pressure drop from atmospheric pressure to a residual pressure in extractor of 0.009 MPa, and then pressure drop from 0.009 MPa to a residual pressure in the extractor 0.0001 MPa, and kept under a given pressure in the extractor for 2 min. Then hot purified air is delivered into the extractor, and cooled down during the process of vacuum treatment mixture is heated to 39° C. Similarly, 5 cycles of the extraction are carried out. The total extraction time amounts to 30 min. As a result, the maximum extraction of all the carriers of healing properties of sea buckthorn seeds takes place, in addition, in the medium of oil the biological activity of the seeds is kept for a long time, and their preservation takes place in the concentration which is achieved in the raw material (the degree of maturity), and the resulting oil extracts have high anti-inflammatory, antibacterial and antioxidant properties.

2. The Extraction of Marigold Flowers 0.5 kg of marigold flowers is placed into a screw doser hopper. A mass of marigold flowers is covered with extractant (dimexide), which is heated to a temperature of 39° C. (module 2). The mixture is delivered with the screw doser to the heated rollers which support the temperature of 38-39° C., and rolled for 3 min. The extractors, extractant tank and the extract receiving tank are blown off with the nitrogen. The resulting presscake from rollers is placed into the extractor, additional hot extractant is added (module 4), heated with hot purified air to 39° C. and subjected to a quick vacuum-impulsive exposure for 0.5 sec. with a stepwise quick pressure drop from atmospheric pressure to a residual pressure in extractor of 0.009 MPa, and then pressure drop from 0.009 MPa to a residual pressure in the extractor 0.0001 MPa, and kept under a given pressure in the extractor for 2 min. Then hot purified nitrogen is delivered into the extractor, and cooled down during the process of vacuum treatment mixture is heated to 39° C. Similarly, 5 cycles of the extraction are carried out. The total extraction time amounts to 30 min. After that, the resulting extract is collected into the extract receiving tank and delivered to a laboratory for analysis of this extract. Use of dimexidum of a strong solvent power leads to the maximum extraction of biologically active organic compounds from the raw material. Having a very high penetrating activity through biological membranes, as well as local anesthetic, antimicrobic and anti-inflammatory properties, the dimexidum dramatically accelerates the absorption through skin and mucous membranes of many drugs, creating the perfect base for drugs. In the solution of dimexidum a solvation of molecules of biologically active compounds takes place, which positively affects the stability of the obtained extracts.

3. Extraction of Fish Residues 1 kg. of washed fish residues (bones, cartilages, heads, skin, bladders, scale, fins and liver of the sturgeon fish) are placed into a screw doser hopper. Fish residues are covered with extractant (50% aqueous ethanol), heated to a temperature of 30-32.degree. C., (module 1). The mixture is delivered with the screw doser to the heated rollers, which support the temperature of 30-32.degree C., and rolled for 5 minutes. Resulting carefully crushed mass from rollers is placed into the extractor, additional hot extract ant is added (module 3), heated with hot purified air to a temperature of 30-32.degree. C. and subjected to quick vacuum-impulsive exposure for 0.5 sec. with stepwise pressure drop from atmospheric pressure to a residual pressure of 0.01 Mpa in the extractor, and then pressure drop from 0.01 Mpa to a residual pressure in the extractor 0.0001 Mpa, and kept at a given pressure in the extractor for 2 min. Then hot purified air is delivered into the extractor, and cooled down during the process of vacuum treatment mixture is heated to 30-32.degree. C. Similarly, 4 cycle of extraction are carried out. The total extraction time amounts to 20 min. The resulting extract contains all the nutrients of fish residues (fat, protein, mineral elements, and vitamins). Complete extraction of protein, including the most biologically important water-soluble fractions, as well as amino acids; minerals, B vitamins and fish oil, arachidonic acid, vitamins A and D creates a high feeding value Of the product. Conducting the processes at low temperatures prevents the formation of indigestible chemicals in the body (compounds of protein nature, and fat, so-called Schiff base). Obtained according to the proposed processing water-alcohol extract after removal of ethanol (no drawing specified) is used as a component of animal feed, as well as an additional product to enrich their diets.

4. Extraction of Milk Powder 1 kg. of skimmed milk is placed into a screw doser hopper. The milk powder is wetted with the extractant (65% aqueous ethanol) (Module 0.5) and delivered with the screw doser to the rollers that support the temperature of the mixture below 25° C., and rolled for 1 min. Wetting of skimmed milk on the rollers with 65% ethanol causes a transition of lactose from amorphous to the crystalline state, greatly improving the wetting of milk. During the preliminary extraction a partial dissolution of lactose (around of 5%) and minerals takes place, and on the surface of milk a cover of insoluble protein is formed, which then allows the extractant to penetrate into the particles and dissolve the lactose, salts and low molecular weight substances and, on the other hand, no give the opportunity to pass the large protein molecules. Resulting mass is placed into the extractor and subjected to quick vacuum-impulsive exposure for 0.5 sec. with stepwise pressure drop from atmospheric pressure to a residual pressure of 0.01 MPa in the extractor, and then pressure drop from 0.01 MPa to a residual pressure in the extractor 0.0001 MPa, and kept at a given pressure in the extractor for 2 min. Then hot purified air is delivered into the extractor and cooled down during the process of vacuum treatment mixture is heated to 25° C.

Similarly, two extraction cycles are carried out. The total extraction time amounts to 10 min. After that, the resulting extract is collected into the extract receiving tank and delivered to the filtration (not shown). As a result of the separation the two valuable products are obtained: a lactose free milk base and a solution of lactose, salts and other substances. Lactose-free milk product, obtained according to this method, has a high quality and can be used to feed children and adults who, because of partial or complete indigestibility of lactose, cannot be fed with the unskimmed milk.

5. Extraction of a Liver of the Altai Mountain Deer

To obtain pharmaceutical products based on the components of the internals of animals (liver, kidneys, lungs, etc.) it is necessary to use the proposed method of extraction. It is especially valuable the use of the internals of wild animals—seals, moose, red deer, etc., which use the natural grass as natural food and accumulate high-value components in their bodies.

1 kg. of a liver of the Altai mountain deer is placed into a screw doser hopper. The deer liver is covered with extractant (20% aqueous ethanol), heated to a temperature of 30-32° C., (module 2). The mixture is delivered with the screw doser to the heated rollers, which support the temperature of 30-32° C., and rolled for 5 minutes. Resulting carefully crushed mass is placed into the extractor, additional hot extractant is added (module 3), heated with hot purified air to 30-32° C. and subjected to a quick vacuum-impulsive exposure for 0.5 sec. with stepwise pressure drop from atmospheric pressure to a residual pressure of 0.01 MPa in the extractor, and then pressure drop from 0.01 MPa to a residual pressure in the extractor 0.0001 MPa, and kept at a given pressure in the extractor for 2 min. Then hot purified air is delivered into the extractor, and cooled down during the process of vacuum treatment mixture is heated to 30-32° C. Similarly, 4 cycle of extraction are carried out. The total extraction time amounts to 20 min. The resulting extract was delivered to consumers for study works to obtain samples of pharmaceutical preparations, etc.

The invention claimed is:

1. A method of using a device having continuously operated heated rollers and an extractor for extraction of a raw material, comprising the steps of:
   (a) heating an extraction solvent,
   (b) preliminarily extracting the raw material by delivering the heated extraction solvent and the raw material onto the heated rollers at a ratio (extraction solvent:raw materials) of not more than 2, to produce a raw material-extraction solvent mixture,
   (c) vacuum-impulsive impregnating and extracting the mixture in a chamber of the device by:
     (1) heating the mixture with hot coolant gas and creating a vacuum in the chamber in a mode of high-speed vacuum-impulsive exposure with stepwise multiple pressure drops: first, from atmospheric pressure to a pressure not more than 0.01 MPa, second, from a pressure not more than 0.01 MPa to a pressure not more than 0.0001 MPa,
     (2) exposing the mixture under vacuum to stabilize the temperature, and
     (3) relieving the vacuum by delivering heated coolant gas into the chamber, wherein the vacuum-impulsive impregnating and extracting is performed in cycles and the temperature of the mixture does not exceed 39° C.

2. The method of claim 1, wherein the extraction solvent is an organic solvent.

3. The method of claim 1, wherein the hot coolant gas is a chemically inert gas.

* * * * *